United States Patent [19]
McEwan et al.

[11] 3,904,868
[45] Sept. 9, 1975

[54] CONTINUOUSLY VARIABLE, REVERSIBLE OPTICAL FILTER

[75] Inventors: William S. McEwan; Peter R. Hammond, both of China Lake, Calif.

[73] Assignee: The United States of America as represented by the Secretary of the Navy, Washington, D.C.

[22] Filed: Oct. 21, 1974

[21] Appl. No.: 516,221

[52] U.S. Cl.............. 250/201; 250/231 P; 250/573; 350/160 R; 350/312
[51] Int. Cl.² ...................... G01J 1/26; G02B 5/22
[58] Field of Search .......... 250/206, 216, 573, 226, 250/200, 231 P, 201; 350/3, 160 R, 161, 312, 149

[56] References Cited
UNITED STATES PATENTS
| | | | |
|---|---|---|---|
| 3,590,356 | 6/1971 | Hofmeister | 318/640 |
| 3,744,423 | 7/1973 | Ertsgaard | 350/3 |

Primary Examiner—James W. Lawrence
Assistant Examiner—E. R. LaRoche
Attorney, Agent, or Firm—R. S. Sciascia; Roy Miller; Lloyd E. K. Pohl

[57] ABSTRACT

The use of a pair of compounds — one an electron acceptor and the other having the ability to donate electrons — in a continuously variable, reversible optical filter is disclosed.

3 Claims, 1 Drawing Figure

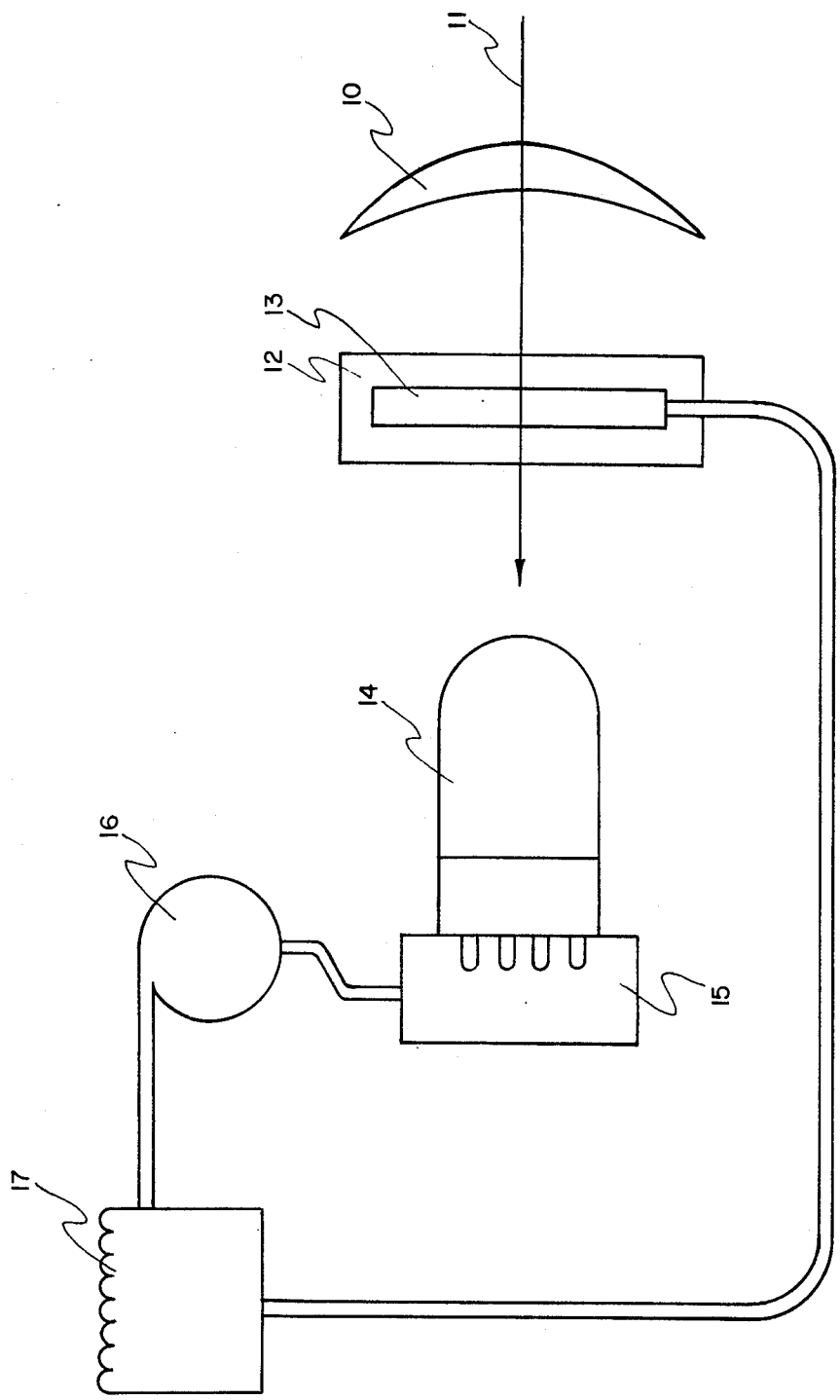

3,904,868

CONTINUOUSLY VARIABLE, REVERSIBLE OPTICAL FILTER

BACKGROUND OF THE INVENTION

1. Field of the Invention

This invention relates to continuously variable, reversible optical filters. More particularly, this invention relates to continuously variable, reversible optical filters which utilize, as a means for filtering, a pair of chemical compounds that produce pressure dependant absorption spectra.

2. Description of the Prior Art.

Optical filters, i.e., devices which control the amount of light passing through them, are known. In the prior art, most such devices have generally either employed a mechanical system of shutters or photochromic materials which react chemically in the presence of light. Other such devices use fluids which are ionized by the application of electrical potential to filter light. Still other such devices utilize a solid suspended in a liquid to filter light.

All of the aforementioned types of optical filters have drawbacks. A mechanical system of shutters is necessarily somewhat complex and subject to malfunction. A chemical reaction between photochromic materials is not readily reversible. The ionization of fluids by the application of electrical potential is a process which demands sophisticated equipment and is not readily reversible. And, of course, a suspended solid cannot be taken out of and put back into suspension at will.

SUMMARY OF THE INVENTION

It has now been found that certain pairs of gaseous materials, when subjected to pressure changes, change insofar as absorption of light is concerned. Accordingly, such pairs of materials may be used in continuously variable, reversible optical filters.

BRIEF DESCRIPTION OF THE DRAWING

The single FIGURE of the drawing is a schematic representation of a system in which pairs of materials according to this invention may be used to filter light.

DESCRIPTION OF THE PREFERRED EMBODIMENTS

Pairs of materials used in the present invention are in the gaseous state. When a pair of materials is placed in a container and arrangements are made for varying the pressure within the container, the container and the materials within it constitute an optical filter.

This may be more easily understood by referring to the FIGURE of the drawing. The FIGURE is a schematic representation of one possible construction of a continuously variable, reversible optical filter according to this invention in which a pair of gaseous materials is used as the filtering means.

The FIGURE depicts a lens 10 through which light rays 11 are passing. Light rays 11 after passing through lens 10 strike and pass through a transparent container 12 which contains a pair of materials 13 according to this invention. After passing through the container 12 of materials 13, the light rays strike a photocell 14. Photocell 14, by means of a servomechanism 15, operates a motor or pump 16 provided that the intensity of the light striking the photocell is sufficient. Motor or pump 16, if operated, compresses a bellows 17 which, in turn, applies pressure to the materials 13 within container 12. Increased pressure on the mixture of materials 13 causes the mixture to absorb more light. Thus, increased pressure on the mixture of materials 13, decreases the amount of light striking photocell 14.

When the amount of light striking photocell 14 is decreased below a threshold point, pump 16 may, be reversed. If it is reversed, bellows 17 is forcibly expanded. Pressure on the mixture of materials 13 is then decreased and, consequently, light absorption is decreased. This causes more light to strike photocell 14 and, consequently, causes reactivation of motor or pump 16.

Pairs or mixtures of materials according to this invention produce, under increased pressure, a new absorption band. Components of such mixtures include one molecular species characterized by a high electron affinity — an electron acceptor — and another molecular species characterized by a low ionization potential — an electron donor. The compounds or components are selected so that they do not react chemically. Nor do they associate in the gaseous state to any marked extent. They are merely acceptor and donor molecules which, when in contact, are able to absorb light by means of an intermolecular electron transfer. Increasing the pressure on them increases the number of molecular contacts so that the new absorbancy increases by the square of the total pressure.

The following table lists electron acceptors and electron donors suitable for use, in pairs, in this invention. The materials listed are suitable for filtering light in the near ultra-violet and violet.

TABLE

| Electron Accepting Gases | Electron Donating Gases |
| --- | --- |
| Selenium hexafluoride | Propene |
| Tellurium hexafluoride | 1-Butene |
| *Tungsten hexafluoride | 2-Methylpropene |
|  | *3-Methyl-2-butene |
|  | *Cyclohexene |
|  | *Benzene |

*Appropriate for use in heated systems at typically 100°C or above.

An equimolar ratio of gases is preferred but not essential.

It is to be realized that the single FIGURE of the drawing represents only one possible arrangement of components whereby pairs or mixtures of materials disclosed herein could be used to filter light. Many other arrangements of components will undoubtedly immediately occur to those skilled in the art upon reading this disclosure.

What is claimed is:

1. A continuously variable, reversible optical filter device comprising:
   a. a filter containing a pair of gaseous materials, one an electron acceptor and the other having the ability to donate electrons;
   b. means for sensing the amount of light passing through said filter translating the senses received into a useable signal and forwarding said signal;
   c. means for receiving said signal and increasing or decreasing the pressure on said pair of gaseous materials according to the signal received.

2. A device according to claim 1 wherein the electron acceptor is selected from the group consisting of selenium hexafluoride, tellurium hexafluoride and tungsten hexafluoride and wherein the material having the ability to donate electrons is selected from the group consisting of propene, 1-butene, 2-methyl-2-butene, cyclohexene and benzene.

3. A device according to claim 2 wherein the means for sensing the amount of light passing through the filter is a photocell and wherein the means for increasing or decreasing the pressure on said pair of gaseous materials is a bellows.

* * * * *